US012673658B2

(12) United States Patent
    Soikkeli et al.

(10) Patent No.:    US 12,673,658 B2
(45) Date of Patent:       Jul. 7, 2026

(54) SYSTEM AND METHOD FOR ELECTRIC PROPULSION PERFORMANCE MONITORING

(71) Applicant: Pipistrel d.o.o, Ajdovščina (SI)

(72) Inventors: Johannes Soikkeli, Wichita, KS (US); Drago Matko, Wichita, KS (US); Steve Hagerott, Wichita, KS (US)

(73) Assignee: Pipistrel d.o.o, Aljovscina (SI)

( * ) Notice:    Subject to any disclaimer, the term of this patent is extended or adjusted under 35 U.S.C. 154(b) by 115 days.

(21) Appl. No.: 18/428,668

(22) Filed:      Jan. 31, 2024

(65)              Prior Publication Data

US 2025/0242791 A1      Jul. 31, 2025

(51) Int. Cl.
    *B60W 10/08*      (2006.01)
    *B64D 31/16*      (2024.01)
    *G08B 21/18*      (2006.01)
    *H02P 29/024*     (2016.01)

(52) U.S. Cl.
    CPC ............. *B60W 10/08* (2013.01); *B64D 31/16* (2024.01); *G08B 21/182* (2013.01); *H02P 29/024* (2013.01)

(58) Field of Classification Search
    CPC ....... B60W 10/08; G07C 5/08; G08B 21/182; B64D 2045/0085; B64D 31/16; B64U 30/20; B64U 50/19; H02P 29/024
    See application file for complete search history.

(56)              References Cited

U.S. PATENT DOCUMENTS

2014/0180545 A1*  6/2014  Bang .................... B62D 5/0463
                                                              701/42
    2015/0166038 A1*  6/2015  Whitney ................ B60W 10/11
                                                              701/54

2018/0029690 A1    2/2018  Hagerott et al.
    2020/0215922 A1*   7/2020  Sawata ................. F02B 63/042
    2023/0314493 A1    10/2023  Petter

FOREIGN PATENT DOCUMENTS

CN        113119748 A  *  7/2021  .......... B60L 15/2045
    EP        3376665 A1      9/2018
    GB        2620603 A       1/2024

OTHER PUBLICATIONS

CN-113119748-A original and translation (Year: 2021).*

* cited by examiner

*Primary Examiner* — Frederick M Brushaber
(74) *Attorney, Agent, or Firm* — Slater Matsil, LLP

(57)              ABSTRACT

A electric propulsion performance monitoring system and method, the method including method, includes generating a propulsion model associated with operation of an electric motor, determining expected parameter values according to the propulsion model, where the expected parameters values are values of a parameter acquirable during the operation of the electric motor, determining a plurality of delayed parameter value sets, where each delayed parameter value set is associated with the expected parameter values at a different associated delay from a time associated with the expected parameter values, determining, according to the expected parameter values and the plurality of delayed parameter value sets, parameter boundaries, acquiring a first parameter value for the operation of the electric motor, raising an error flag in response to the first parameter value falling outside the parameter boundaries, and generating commands for modifying operation of the electric motor in response to the error flag being raised.

20 Claims, 5 Drawing Sheets

SYSTEM AND METHOD FOR ELECTRIC PROPULSION PERFORMANCE MONITORING

TECHNICAL FIELD

The present disclosure relates generally to a system and method for monitoring the performance of an electric propulsion system, and, in particular embodiments, to a system and method for modeling expected revolutions per minute (RPM) and torque for an electric motor by using a time delay in the model and controlling operation of an electric motor of the measured performance of the motor falls outside of a tolerance of the model.

BACKGROUND

Generally, aircraft propulsion units, such as electric motors, have measurable performance parameters that may be used as feedback when controlling the operation of the unit. Specifically, within the context of an aircraft, the revolutions per minute (RPM) of a motor can serve as an indicator, at least in part, of the thrust output of the propulsion unit when coupled with a fixed-pitch propeller in the aircraft's propulsion system. In scenarios involving variable-pitch propeller systems, the thrust generated by a motor can be inferred from a combination of the RPM and the propeller's pitch setting. This capability to ascertain the thrust generated by the propulsion unit proves especially advantageous in systems designed for vertical propulsion, such as in drones, as well as in various other thrust propulsion systems. This is because the attitude and resulting maneuvering may be controlled by multiple vertical propulsion units in a vertical takeoff capable aircraft, which may, in some instances, not have fixed lift-generating surfaces such as wings, or may rely primarily on the lift provided by the vertical propulsion units for at least part of the aircraft's flight.

The ability to monitor performance parameters of aircraft propulsion systems provides the ability to perform precise control of aircraft maneuvering since different motors may be individually controlled to provide fine maneuvering or movement.

SUMMARY

An embodiment system includes an electric motor, at least one processor, and at least one non-transitory computer readable memory connected to the at least one processor and including computer program code. The at least one non-transitory computer readable memory and the computer program code are configured, with the at least one processor, to cause the system to perform at least determining a first parameter model having expected parameter values and associated with operation of the electric motor, where the expected parameters values are values of a parameter acquirable during operation of the electric motor, determining a plurality of second parameter models having a plurality of delayed parameter value sets, where each delayed parameter value set is associated with the expected parameter values at a different associated delay from a time associated with the expected parameter values, determining, according to the first parameter model and the plurality of second parameter models, parameter boundaries, acquiring a first parameter value for the operation of the electric motor, raising an error flag in response to the first parameter value falling outside the parameter boundaries, and modifying operation of the electric motor in response to the error flag being raised.

An embodiment system includes at least one processor, and at least one non-transitory computer readable memory connected to the at least one processor and including computer program code. The at least one non-transitory computer readable memory and the computer program code are configured, with the at least one processor, to cause the system to perform at least determining one or more first parameter models each having expected parameter values and being associated with operation of an electric motor, where the expected parameters values of each first parameter model of the one or more first parameter models are values of a different parameter acquirable during operation of the electric motor, determining, for each first parameter model of the one or more first parameter models, a plurality of second parameter models, where each second parameter model of the plurality of second parameter models has a plurality of delayed parameter value sets, where each delayed parameter value set is associated with the expected parameter values of the respective first parameter model, at a different associated delay from a time associated with the expected parameter values of the respective first parameter model, determining parameter boundaries for each first parameter model of the one or more parameter models according to the respective first parameter model and the plurality of second parameter models associated with the respective first parameter model, acquiring one or more first parameter values for the operation of the electric motor, where the one or more first parameter values are each associated with the expected parameters values of a first parameter model of the one or more first parameter models, raising an error flag in response to at least one of the one or more first parameter values falling outside respective parameter boundaries, and modifying operation of the electric motor in response to the error flag being raised.

An embodiment method, includes generating a propulsion model associated with operation of an electric motor, determining expected parameter values according to the propulsion model, where the expected parameters values are values of a parameter acquirable during the operation of the electric motor, determining a plurality of delayed parameter value sets, where each delayed parameter value set is associated with the expected parameter values at a different associated delay from a time associated with the expected parameter values, determining, according to the expected parameter values and the plurality of delayed parameter value sets, parameter boundaries, acquiring a first parameter value for the operation of the electric motor, raising an error flag in response to the first parameter value falling outside the parameter boundaries, and generating commands for modifying operation of the electric motor in response to the error flag being raised.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
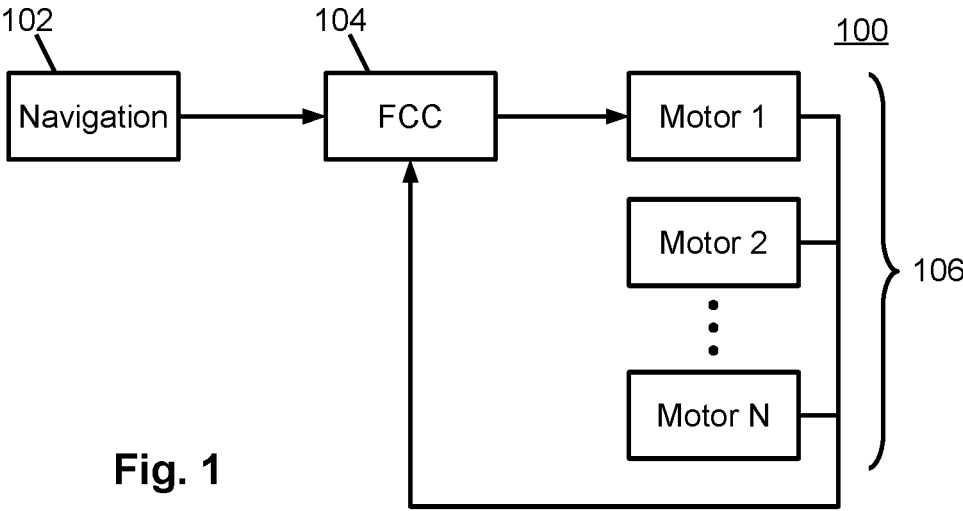
FIG. 1 is a logical diagram illustrating a propulsion system according to some embodiments.

Electric drive systems provide the ability for designers to incorporate robust and responsive systems in vehicles due to the versatile nature of electric motors of the electric drive systems. Additionally, electric drive systems are highly configurable and controllable, with the performance of the electric motors being highly controllable. The nature of electric motor control allows for rapid and accurate gathering of data on the performance of the electric motor or overall drive system. The performance data may be used as feedback for control of the motor or drive system, and to monitor the motor for proper operation.

In vertical takeoff capable aircraft, the use of multiple electric motors provides redundancy and maneuverability for the aircraft. The electric drive system of aircraft may also provide vertical lift capability, enabling the aircraft to perform vertical take-offs and landings, and to operate without traditional lifting surfaces such as wings. Additionally, independent control of different propulsion units enhances maneuverability through differential thrust. The use of multiple motors contributes to cost reduction and system simplicity. This design is complemented by the employment of fixed-pitch propellers, which, while simplifying the propulsion system, necessitate precise control of RPM for effective modulation of thrust. In order to safeguard against erroneous commands, or to detect power loss or blade loss in the electric propulsion system, an embodiment system may use an independent monitoring system to monitor motor performance parameters.

The monitoring system may use an onboard model of the propulsion system performance to calculate, in some embodiments, performance parameters for expected RPM and torque levels, enabling modeling with measured RPM and torque. In other embodiments, other performance parameters, such as current draw, thrust or stress, airspeed, or the like, may be used to monitor the performance of an electric propulsion system, or an internal combustion propulsion system, hydrogen propulsion system, hybrid propulsion system or other type of propulsion system. The monitoring system may monitor commands to motors, engine control computers (ECCs), motor controllers, or the like, and may generate a model of expected values of monitored parameters, as well as upper and lower boundaries for the expected values. In embodiments where the monitoring system monitors both the revolutions per minute (RPM) and torque of a propulsion system, a unified architecture may be employed for monitoring both the RPM and torque. Additionally, in some embodiments, for a monitoring system that monitors both the RPM and torque of an electric propulsion system, the same architecture used for monitoring RPM may be used to monitor the torque provided to simplify monitor design and optimize performance. However, monitoring systems for other operating parameters such as current, thrust, stress, airspeed, or the like, may use a similar or substantially analogous system, so that multiple parameters may be monitored without significant system changes. Additionally, in some embodiments, the monitoring system may be implemented in an ECC, by a separate chipset, or in another system or device. The acceptable bounds for a measured value are dynamically computed by introducing a delay to the expected value, or in in some embodiments, to the measured value, to establish a window of acceptable performance, or in which the measured values must be found for a motor to be identified as properly operating. Using the window, with delays for the expected values, is particularly useful with large amplitude commands, as the time offset on the boundaries increases the distance to the nearest limit of a boundary, accounting for the uncertainty in the actual value, and in timing. Thus, the system can handle violent inputs without the monitor inadvertently or falsely triggering.

FIG. 1 is a logical diagram illustrating a propulsion system 100 according to some embodiments. The system 100 may have a flight control computer (FCC) 104 that controls one or more motors 106, either directly, or indirectly through one or more motor controllers, speed controllers, engine control computers (ECCs), or the like.

The FCC 104 may receive signals from an exterior system such as a navigation system 102 or the like. In some embodiments, the FCC 104 may then pass the commands to the motors 106 or motor controllers, which may generate one or more motor commands that cause the motors 106 to achieve the desired operating parameters, or otherwise control the motors 106.

In some embodiments, the FCC 104 receives feedback from the motors 106 and may use that feedback as part of a data set for controlling the motors 106. The feedback may include one or more pieces of data from one or more data signals generated by sensors associated with the motors, or with other features of the aircraft. For example, an FCC 104 may determine to fly the aircraft at a particular forward airspeed, and may determine a particular RPM for each motor 106. The FCC 104 may then send one or more commands, directly or indirectly, to the motor controller, speed controller, ECC, or the like, to establish the desired RPM for the motors 106. Alternatively, the FCC 104 itself may directly manage the motors 106 to attain the selected RPM. Commanding the motors 106 to perform at the selected RPM may include increasing a voltage or current flow to a motor, adjusting the timing of brushless motors, or the like. The FCC 104 may get RPM data from RPM sensors in the motors and may use the feedback to adjust the current or timing to achieve the desired RPM. In some embodiments, a proportional-integral-derivative (PID) or similar control method may be utilized for feedback control, and may adjust the motor's RPM.

In embodiments, the FCC 104 functions as the monitoring system, monitoring the operating parameters and determining whether a motor 106 or the propulsion system has encountered a failure. This may include, for example, a motor 106 burning out, a propeller being damaged or lost, sensor failure, or another anomaly leading to a loss of thrust, such as debris damaging the propeller. In other embodiments, a separate system monitors the operation of the propulsion unit 106.

The monitoring system, whether an FCC or independent monitoring system, may include one or more processors and one or more computer readable medium storing computer code thereon. References to computer-readable storage medium, computer program product, tangibly embodied computer program, or the like, or a controller, monitor, engine monitor, monitoring system, computer, processor, or the like should be understood to encompass not only computers having different architectures such as single or multi-processor architectures and sequential (Von Neumann) or parallel architectures but also specialized circuits such as field-programmable gate arrays (FPGAs), application specific circuits (ASICs), signal processing devices and other devices. References to computer program, instructions, code, or the like, should be understood to encompass software for a programmable processor or firmware such as, for example, the programmable content of a hardware device whether instructions for a processor, or configuration settings for a fixed-function device, gate array or programmable logic device, or the like.

The monitoring system may have at least one processor and at least one memory, such as a non-transitory computer readable medium, and may include computer program code, that is configured to, with the at least one processor, provide the propulsion unit monitoring. The memory may be a single component or it may be implemented as one or more separate components some or all of which may be integrated or removable and may provide permanent, semi-permanent, dynamic, or cached storage.

The one or more processors are configured to read from and write to the at least one memory. The processor may also comprise an output interface via which data or commands are output by the processor and an input interface via which data or commands are input to the processor. The memory stores a computer program including computer program instructions that control the operation of the engine monitoring, and possibly the overall system, when loaded into the processor. The computer program instructions provide the logic and routines that enable the apparatus to perform the engine monitoring methods and implement the engine monitoring systems. The processor, by reading the memory, is able to load and execute the computer program. The computer program or programs may arrive at the apparatus via any suitable delivery mechanism. The delivery mechanism may be, for example, a computer-readable storage medium, a computer program product, a memory device, a record medium such as a compact disc read on only memory (CD-ROM), digital versatile disc (DVD), portable memory such as a memory stick or hard drive, or the like, an article of manufacture that tangibly embodies the computer program. In some embodiments, the delivery mechanism may be a signal configured to reliably transfer the computer program over the air or via an electrical connection.

In some embodiments, the FCC 104 or independent monitor generates a model of the expected performance parameters based on the commands, and uses a time delay to generate one or more delayed models. The delayed models are models of expected performance that are delayed from an original expected time by some delay time, and may be used to define upper and lower boundaries for acceptable performance parameter. The measured performance parameter values are monitored to ensure that the measured performance parameters fall within the upper and lower boundaries. In some embodiments, the FCC 104 may adjust the operation of a motor 106 with performance parameters falling outside of the upper or lower boundaries, and may include shutting down the motor, adjusting a target or commanded performance parameter, or the like. In other embodiments, the independent monitor raises an error flag for the FCC 104, which may take action to address the error condition. For example, where the RPM of a motor exceeds an upper bound, the FCC 104 may shut off the motor 106, assuming that a particular power level of current level that causes the RPM to exceed the upper boundary of expected RPM values indicates that the motor 106 has lost the propeller or the drive train has broken. This may be due to the lack of drag or load on the motor, allowing the motor 106 to run free at a high RPM. In another example, where the RPM of a motor 106 falls below a lower bound, the FCC 104 may apply additional power or current to bring the RPM into the expected range, or may shut off the motor 106. The low RPM may indicate that the motor 106 experiences higher than normal load, such as rain, wind, high density air, or the like, or that the drive train or propeller have encountered a physical block, such as debris entangled in the propeller or drive train, preventing the propeller from turning at the desired RPM for the associated supplied current or power.

Figure 2:
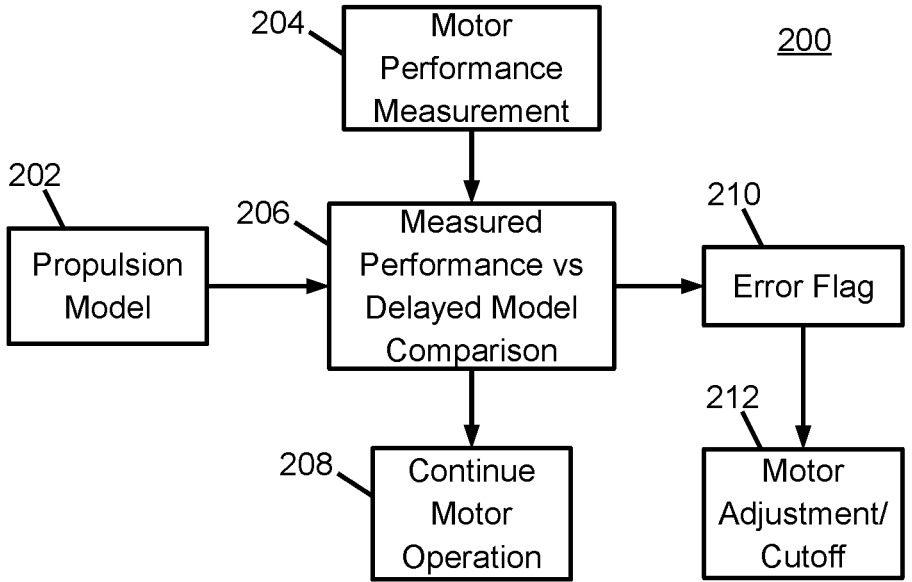
FIG. 2 is a flow diagram illustrating a method for controlling the operation of an electric propulsion system based on motor performance according to some embodiments.

FIG. 2 is a flow diagram illustrating a method 200 for controlling the operation of an electric propulsion system based on propulsion unit performance according to some embodiments. In block 202, a propulsion model is generated. In some embodiments, an FCC may generate the propulsion model, and in other embodiments, the propulsion model may be generated by an outside monitor, motor control system, or the like. The propulsion model may be associated with the commands to the propulsion unit, and may be generated to reflect the expected output parameter values from a propulsion unit when a command is provided to the propulsion unit. Additionally, the model may be constantly updated to reflect new commands, changing conditions, and to provide the model for periods after the initial model time window. For example, a model may be generated for a motor according to known performance characteristics of the motor. In some embodiments, when the model is generated, the model may reflect that the expected RPM will increase over an acceleration curve to a target RPM when the model detects a command for that RPM. Thus, a command issued to the motor may cause the model to be updated, and the model may generate new expected RPM values when new commands are issued to the motor. For example, a first command for the motor to operate at a first RPM level may result in a first model, with the first model indicating that the expected performance should be at the desired RPM, and that it should stay at the first RPM since no other commands have been issued. When a second command for the motor to operate at a second, different RPM is issued, the first model may be modified to form the second model, or a new, second model may be generated. In some embodiments, the models may be for a predetermined time window extending from a current or present time, or the like. Thus, a model may project expected operating parameters for example, for five seconds, or ten seconds, and the model may be updated as time passes to expand the model ahead of the real-time monitoring passing the end of an existing model. In other embodiments, the model may be calculated in real-time, with the FCC calculating the model for an instantaneous and current time.

In block 204, motor performance measurements are acquired. In some embodiments, the motor performance may be indicated by data sent by a particular motor or sensors associated with the motors. In other embodiments, the motor performance measurements are taken by an independent monitoring system. The motor performance measurements may be provided to the FCC or separate monitoring system as a stream, as discrete or message-based data, or the like. The motor performance measurements may, in some embodiments, include RPM or torque measurements that may be compared directly to the model. In other embodiments, the actual measured data may be intermediate data values from which the desired measurement parameters are generated. For example, a motor controller may measure the current provided to a motor and may provide that data to the FCC or separate monitoring system, which may determine the torque generated by a motor, and may use the torque as a measured performance parameter for comparison to the model. In block 206, the measured performance is compared to the delayed model. In some embodiments, the propulsion model has delay introduced to compensate for measurement and performance delays, and the delayed model calculations may be used to determine upper and lower boundaries for the measured motor performance. Additionally, in some embodiments, the boundaries may be further adjusted by allowing some variance or tolerance from the delayed model projected performance values. Thus, a delayed model may include time delays and amplitude adjustments to boundaries from the actual calculated values. In some embodiments, the measured values may also be optionally delayed to account for the rapidity of performance acquisition. For example, torque readings may be acquired with little delay, so that they are available instantaneously, while RPM values may take longer to acquire due to the need for the propeller to accelerate to the desired RPM. Thus, if the model has a delay introduced, the RPM values may align with the delayed model, but the torque values may need to be delayed to align the measured torque values with the delayed model. For example, the model may include the expected performance of a motor with delays of 0 milliseconds (ms), and about 50 ms, 100 ms, 150 ms, and 200 ms, and the boundaries calculated from the delayed values. Measured RPM may be compared to the boundaries of the delayed model when the values of the RPM are received, but torque values may be delayed 100 ms after receipt of the measured torque values to ensure that torque values are not exceeding the boundaries due to being too close to the non-delayed, or 0 ms delay, model.

In some embodiments, comparing the measured values to the delayed model may include determining whether an error occurs in the measured values. In some embodiments, an error may be determined to have occurred if the measured values at all exceed a boundary of the delayed model. In other embodiments, an error may be where the measured values exceed a boundary of the delayed model more than once within a particular time window, or exceed a boundary of the delayed model for longer than a particular time, if both an RPM and torque exceed boundaries of the delayed model, or according to another criterion.

In block 210, an error flag may be raised if an error is determined to have occurred as a result of the comparison of the measured performance verse the delayed model. In some embodiments, the error flag is raised or set within the FCC, and the FCC may adjust control of the motor in block 212 by performing motor performance adjustment or cutoff. In block 208, motor operation may be continued if no error is determined to have occurred as a result of the comparison of the measured performance verse the delated model.

Figure 3A:
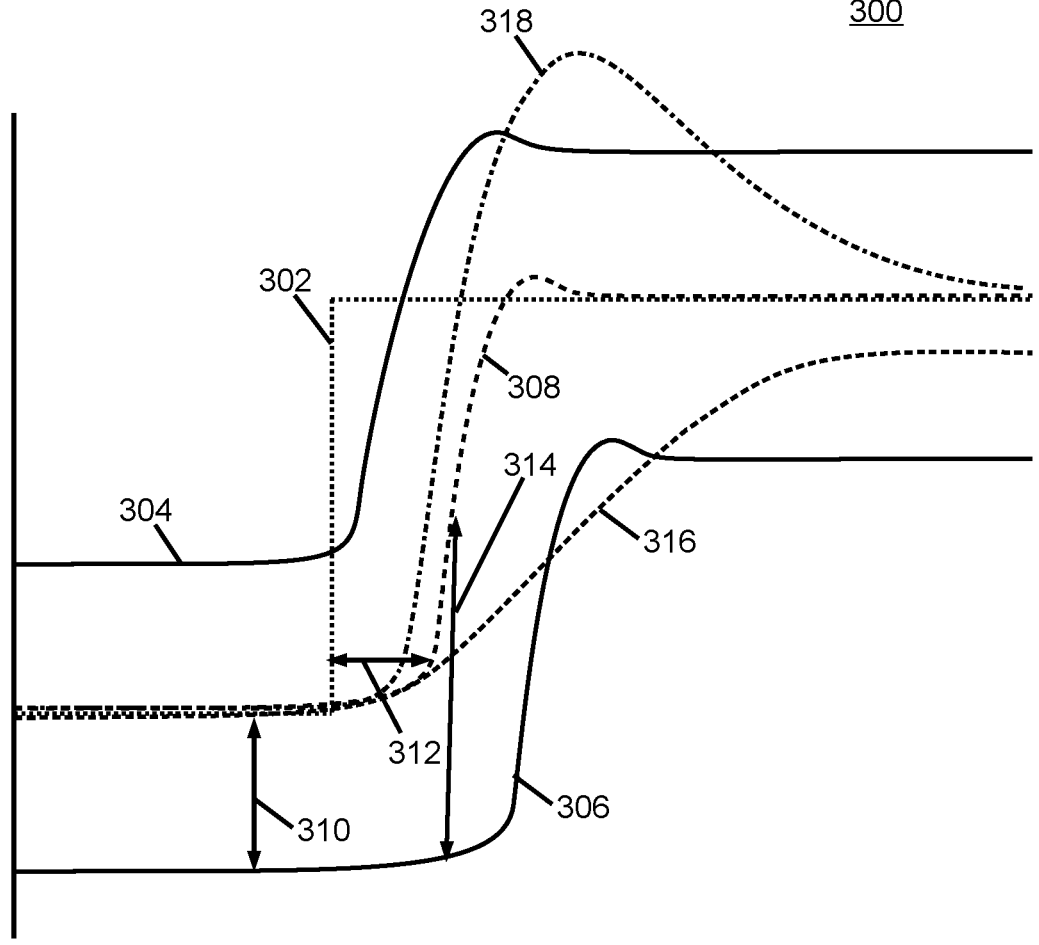
FIGS. 3A-3B are time history graphs illustrating monitor performance and operational boundaries within a monitoring system according to some embodiments.
Figure 3B:
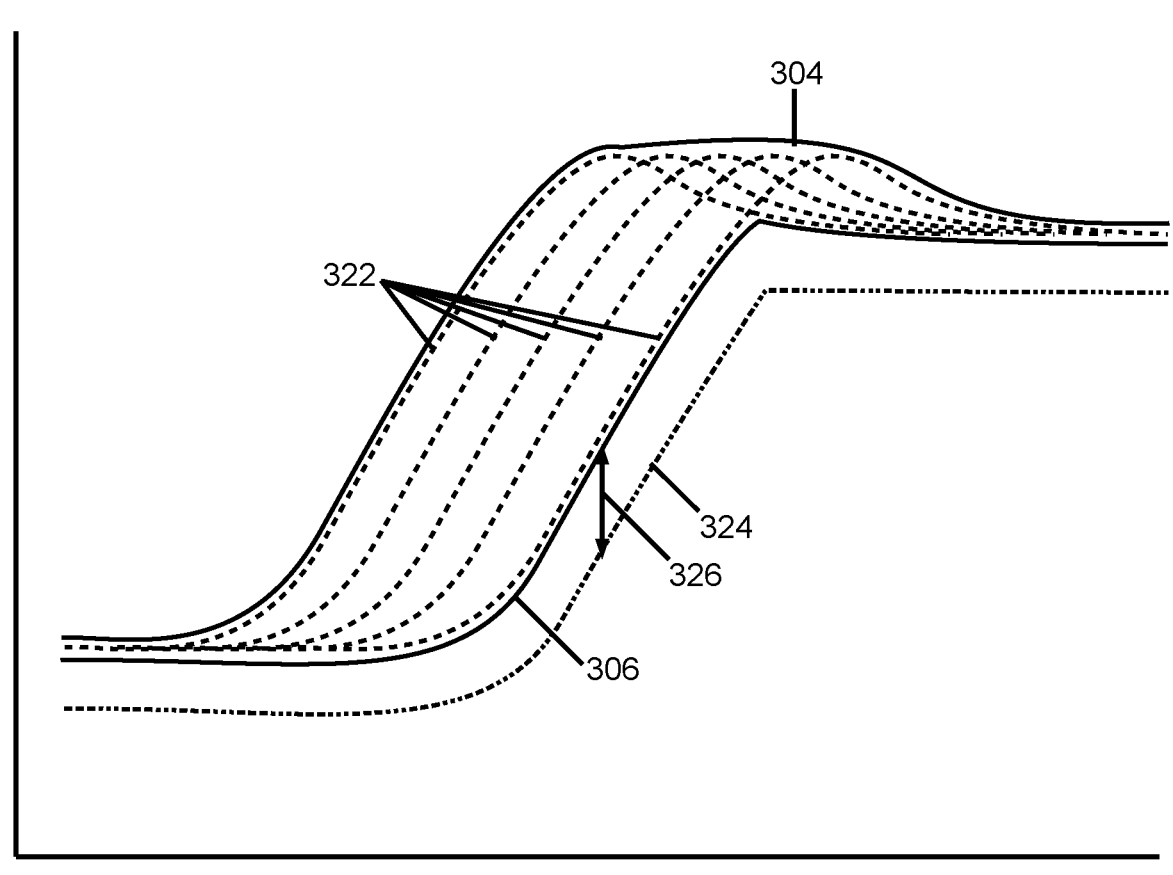

FIGS. 3A-3B are time history graphs illustrating monitor performance and operational boundaries within a monitoring system according to some embodiments. FIG. 3A illustrates a time history graph with boundaries 304, 306 for a performance model 300 according to some embodiments. The performance model 300 may include a delayed model illustrating an expected performance with some delay after a commanded value 302. The commanded value 302 may be values reflecting a command from and FCC or other control system. The commanded value 302 may, for example, be a set of ideal values associated with a desired performance. Due to a motor needing to accelerate to a desired performance level, the actual performance of the motor may not track the commanded value 302 perfectly. The performance model 300 may be, or have features, derived from an engine model related to how a motor performs in real world conditions, and in some embodiments, accounts for delay in measured values due to lag or delay in the actual performance of the motor, due to filtering of the sensor readings, or the like. Thus, measured performance values 308 of a motor may be offset in time by some delay 312 from the commanded value 302.

One or more boundaries 304, 306 may be derived or determined for the performance model 300. The boundaries 304, 306 may define an acceptable performance window by having a tolerance 310 that offsets the boundaries 304, 306, from a commanded value, or a delayed model. In some embodiments, the boundaries 304, 306 are derived from one or more delayed models, and may be offset along both the x-axis and y-axis. This offset in both value tolerances and time delay creates a window of acceptable performance values. In some embodiments, a maximum boundary 304 may be a set of maximum parameters determined from the models 322 at a particular time, with each maximum value being at a different time, and the set of maximum values forming the maximum boundary 304. Similarly, a minimum boundary 306 may be a set of minimum parameters determined from the models 322 at a particular time, with each minimum value being at a different time, and the set of minimum values forming the minimum boundary 306.

The operating window is, in some embodiments, more robust for large amplitude inputs. During transient phases with large amplitude commands, the time offset or delay 312 in the limits increases the distance 314 to the boundary 304, 306. This accounts for the uncertainty in the actual value through tolerance and also accounts for the uncertainty in timing using time offsets or delays 312. As a result, a monitor using the model 300 can handle violent inputs without the monitor coming too close to triggering. Additionally, during such inputs, the distance to triggering is increased due to the expanded limits.

However, the window still catches measured values with large deviations from the boundaries or expected performance values, whether varying in time or amplitude. For example, a set of first test measurements 318 exceeds the upper limit due to the first test measurements 318 exceeding an expected value with excess amplitude. In another example, a set of second test measurement 316 lags an expected value in time, taking substantially more time than expected to reach the commanded value. The lag in reaching the commanded value causes the second test measurements to exceed, or be below, a portion of the lower boundary 306.

FIG. 3B illustrates delayed models 322 according to some embodiments. The delayed models 322 may reflect the expected parameter value, along the y-axis, over time, along the x-axis. The expected parameter values of the delayed models 322 may be based on calculations of performance of a motor according to a command value, and expected values delayed by one or more time offsets or delay times. Boundaries 304, 306 and delayed models 322 may be generated for both torque and RPM so that multiple operating parameters for a motor may be monitored. Indeed, boundaries and models for any operating parameters of any machinery may be monitored using the disclosed boundary determination process and system, as the RPM and torque monitoring for an electric motor are just examples of the presented principles.

Multiple levels of delay to the expected RPM or torque values may be used to determine the boundaries 304, 306. In some embodiments, there may be between three levels and eight levels of delay used, and in some embodiments, there may be five levels of delay. From the different expected values at different delay values, the minimum and maximum values at any particular time are used for the boundaries 304, 306, essentially reducing the delayed models 322 back to single values. In some embodiments, a tolerance 326 may be added to these boundaries 304, 306 to generate final boundaries or an upper boundary (not shown) and lower boundary 324. This results in the window or path within which the actual RPM or torque values are permitted to operate.

Under normal conditions, the measured signal should reside in the middle of this path. Therefore, a slight delay may be added to the actual signal to align it with the center of the path. In some embodiments, for a measured RPM, this additional delay is not necessary because the measured signal inherently has enough delay to align with the center of the path. However, in embodiments where torque is measured, the torque may be measured very fast, and a delay may be introduced to properly center it within the path. In some embodiments, the delay is between 20 and 400 ms, and in other embodiments, the delay is 100 ms.

Additionally, in some embodiments, the system also determines to which boundary (upper or lower) the measured value is closer, and calculates the difference from that bound, and applies a filter.

Figure 4:
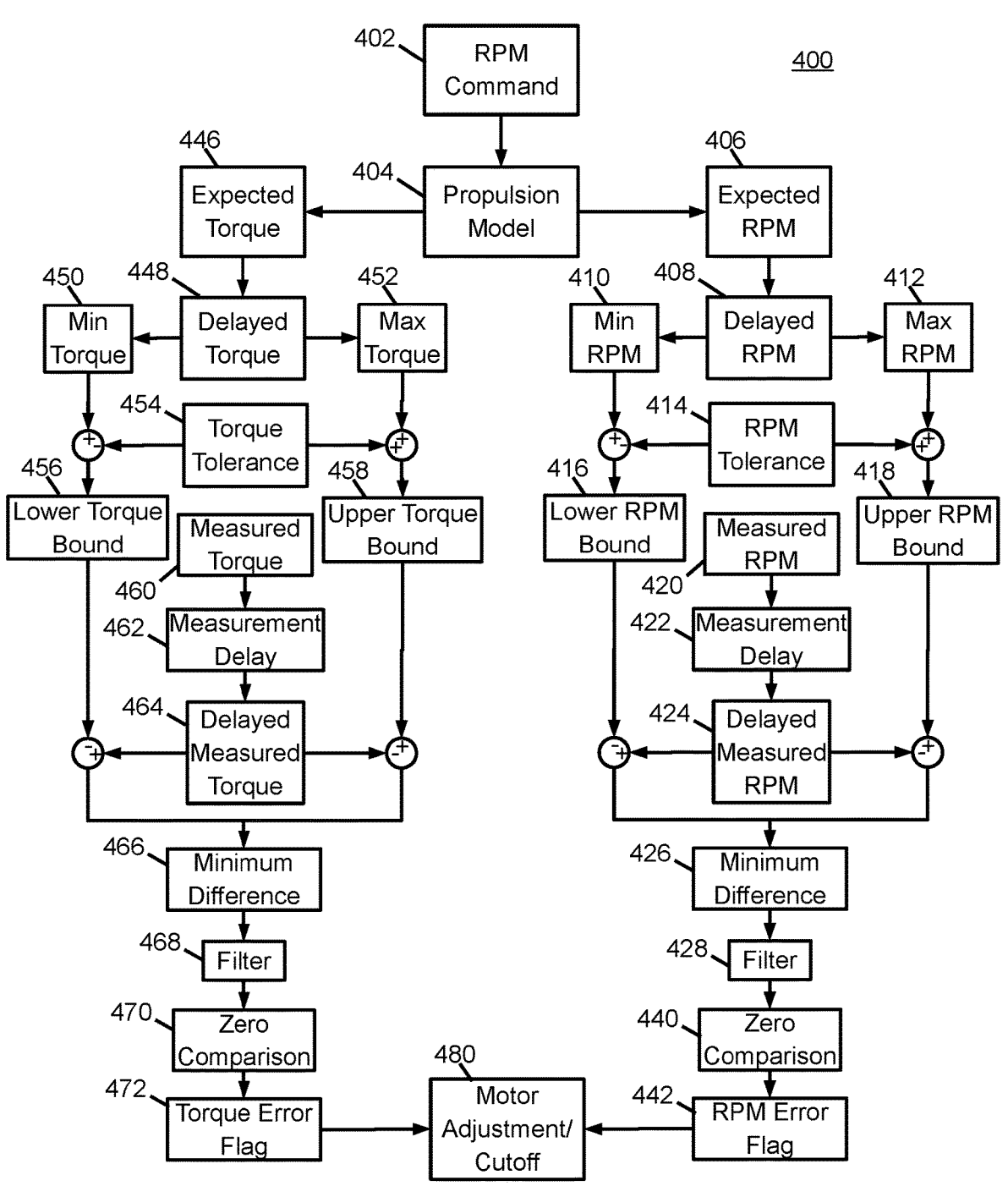
FIG. 4 is a logical diagram illustrating a system for monitoring an electric propulsion system according to some embodiments.

FIG. 4 is a logical diagram illustrating a system 400 for monitoring an electric propulsion system according to some embodiments. In some embodiments, the system monitors both RPM and torque, and may calculate separate models and boundaries for the RPM and torque values.

In some embodiments, an FCC or other monitoring system may initially receive an RPM command, for example from a pilot, control system, navigation system, or the like. A propulsion model 404 is generated and reflects the RPM command. The propulsion model may be generated according to known performance characteristics of a motor being monitored, and may also, in some embodiments, account for external factors such as motor temperature, air density or pressure, wind speed, air temperature, humidity, or other factors. An RPM model, or expected RPM values 406, and a torque model, or expected torque values 446, may be determined from the propulsion model 404. The RPM model and torque model may be part of the propulsion model 404, or may be derived or developed from the propulsion model 404. The expected RPM 406 and expected torque 446 may be one or more values over time that are associated with the RPM command 402.

For RPM monitoring, the expected RPM values 406 may be used to develop one or more delayed RPM models 408. In some embodiments, the delayed RPM 408 models are one or more copies of the expected RPM values 406 adjusted by some delay time. For example, the delayed RPM models may include five RPM models shifted by different delay times. Thus, the delayed RPM models 408 may include a model of the original expected RPM values 406 without delay, or with a 0 ms delay. The delayed RPM models may further include four additional models of the original expected RPM values 406 delayed or offset by, for example, 50 ms, 100 ms, 150 ms, and 200 ms. Thus, the same model may be used multiple times with different time delays or offsets.

Minimum RPM values 410 and maximum RPM values 412 are determined from the delayed RPM models 408. The minimum RPM values 410 may be the minimum values of all of the delayed RPM values 408 at each time across a time window covered by all of the delayed RPM values 408. Similarly, the maximum RPM values 412 may be the maximum values of all of the delayed RPM values 408 at each time across a time window covered by all of the delayed RPM values 408. In some embodiments, an RPM tolerance 414 is added to, or subtracted from, the minimum RPM values 410 and maximum RPM values 412 to generate the lower RPM boundary 416 and upper RPM boundary 418. In some embodiments, the RPM tolerance 414 is the same for generating both the lower and upper RPM boundaries 416, 418. In other embodiments, different RPM tolerances 414 may be used generating the lower and upper RPM boundaries 416, 418, and may be adjusted or set according to the motor, according to the command or performance of the motor, or according to another factor.

In some embodiments, the RPM tolerance 414 may be subtracted from the minimum RPM values 410 so that the lower RPM boundary 416 is shifted downward, or to have lower values than the delayed RPM values 408 to provide some flexibility when monitoring dynamic motor RPM values. Similarly, the RPM tolerance 414 may be added to the maximum RPM values 412 so that the upper RPM boundary is shifted upward, or to have higher values than the delayed RPM values 408.

Measured RPM values 420 may be acquired by an FCC or other monitoring system. In some embodiments, a measurement delay 422 may be added to the measured RPM values 420 to generate delayed measured RPM values 424. In other embodiments where no time delay or measurement delay is used, the delayed measured RPM values 424 may be the same as the measured RPM values at the same times, with a 0 ms delay.

The delayed measured RPM values 424 may be compared to the lower RPM boundary 416 and upper RPM boundary 418. In some embodiments, the lower RPM boundary 416 is subtracted from the delayed measured RPM value 424, and the delayed measured RPM value is subtracted from the upper RPM boundary 418, and a minimum difference 426 between the comparisons of the RPM boundaries 416, 418 to the delayed measured RPM 424 is determined. In some embodiments, comparisons of the RPM boundaries 416, 418 to the delayed measured RPM 424 give a positive comparison result if the delayed measured RPM is within the RPM boundaries 416, 418, and give a negative result for the delayed measured RPM being outside the RPM boundaries 416, 418. Thus, a zero comparison 440 may be used to determine whether the delayed measured RPM 424 falls within the boundaries 416, 418. In some embodiments, the zero comparison 440 is a check on whether the comparisons of the RPM boundaries 416, 418 to the delayed measured RPM 424 results in a negative comparison result, indicating that the delayed measured RPM 424 has encountered an error or is in an out of boundary condition.

In some embodiments, a filter 428 may be applied to the minimum difference 426, or to the comparisons of the RPM boundaries 416, 418 to the delayed measured RPM 424, before determining whether the delayed measured RPM 424 falls within the RPM boundaries 416, 418. In some embodiments, the filter 428 is a first-order filter that filters out high-frequency occurrences of out of boundary conditions or error conditions, to prevent spurious error identification for transient error conditions or momentary out-of-boundary conditions that are non-persistent. In other embodiments, the filter 428 checks for an out-of-boundary condition for some predetermined time, a predetermined number of comparisons, or the like. In other embodiments, the filter 428 is a different filter or filtering system. The filter 428 may filter out minimum differences that need not be used for zero comparison or raising an error flag, permitting normal operation of the motor to continue, or maintaining a non-error state for the RPM measurement.

If the zero comparison 440 determines that a non-error state has occurred, or that the delayed measured RPM 424 is not outside of the RPM boundaries 416, 418, then the system continues normal operation of the motor, or maintains a non-error state for the RPM measurement. If the zero comparison 440 indicates that the RPM is in an error state, or that the delayed measured RPM 424 is outside the RPM boundaries 416, 418 an RPM error flag 442 may be raised, and the system may perform motor adjustment or cutoff 480 in response to the RPM error flag 442.

A similar process may be used separately for torque measurement. For torque monitoring, the expected torque values 446 may be used to develop one or more delayed torque models 448. In some embodiments the delayed torque 448 models are one or more copies of the expected torque values 446 adjusted by some delay time. The delayed torque models 448 may include five torque models at shifted by different delay times. Thus, the delayed torque models 448 may include a model of the original expected torque values 446 and four additional models of the original expected torque values 446 delayed or offset by, for example, 0 ms, 50 ms, 100 ms, 150 ms, and 200 ms. Thus, the same torque model may be used multiple times with different time delays or offsets.

Minimum torque values 450 and maximum torque values 452 are determined from the delayed torque models 448. The minimum torque values 450 may be the minimum values of all of the delayed torque values 448 at each time across a time window covered by all of the delayed torque values 448. The maximum torque values 452 may be the maximum values of all of the delayed torque values 448 at each time across a time window covered by all of the delayed torque values 448. In some embodiments, a torque tolerance 454 is added to, or subtracted from, the minimum torque values 450 and maximum torque values 452 to generate the lower torque boundary 456 and upper torque boundary 458. In some embodiments, the torque tolerance 454 is the same for generating both the lower and upper torque boundaries 456, 458, and may be associated with, proportional to, or otherwise related to the RPM tolerance 414. In other embodiments, different torque tolerances 454 may be used generating the lower and upper torque boundaries 456, 458, and may be adjusted or set according to the motor, according to the command or performance of the motor, or according to another factor.

In some embodiments, the torque tolerance 454 may be subtracted from the minimum torque values 450 so that the lower torque boundary 456 is shifted downward, or to have lower values than the delayed torque values 458, and the torque tolerance 454 may be added to the maximum torque values 452 so that the upper torque boundary 458 is shifted upward, or to have higher values than the delayed torque values 458.

Measured torque values 460 may be acquired by an FCC or other monitoring system. In some embodiments, a measurement delay 462 may be added to the measured torque values 460 to generate delayed measured torque values 464. In other embodiments where no time delay or measurement delay is used, the delayed measured torque values 464 may be the same as the measured torque values at the same times, with a 0 ms delay.

The delayed measured torque values 464 may be compared to the lower torque boundary 456 and upper torque boundary 458. In some embodiments, the lower torque boundary 456 is subtracted from the delayed measured torque value 464, and the delayed measured torque value 464 is subtracted from the upper torque boundary 458. A minimum difference 466 between the comparisons of the torque boundaries 456, 458 to the delayed measured RPM 424 is determined. In some embodiments, comparisons of the torque boundaries 456, 458 to the delayed measured torque 464 give a positive comparison result if the delayed measured torque is within the torque boundaries 456, 458, and give a negative result for the delayed measured torque 464 being outside the torque boundaries 456, 458. Thus, a zero comparison 470 may be used to determine whether the delayed measured torque 464 falls within the boundaries 456, 458. In some embodiments, the zero comparison 470 is a check on whether the comparisons of the torque boundaries 456, 458 to the delayed measured torque 464 results in a negative comparison result, indicating that the delayed measured RPM has encountered an error is in an out of boundary condition.

In some embodiments, a filter 468 may be applied to the minimum difference 466, or to the comparisons of the torque boundaries 456, 458 to the delayed measured torque 464, before determining whether the delayed measured torque 464 falls within the torque boundaries 456, 458. In some embodiments, the filter 468 is a first order filter similar to the filter 428 used for filtering RPM measurement results.

If the zero comparison 470 determines that a non-error state has occurred, or that the delayed measured torque 464 is not outside of the torque boundaries 456, 458, then the system continues normal operation of the motor, or maintains a non-error state for the torque measurement. If the zero comparison 470 indicates that the torque is in an error state, or that the delayed measured torque 464 is outside the torque boundaries 456, 458 a torque error flag 472 may be raised, and the system may perform motor adjustment or cutoff 480 in response to the torque error flag 472.

Figure 5:
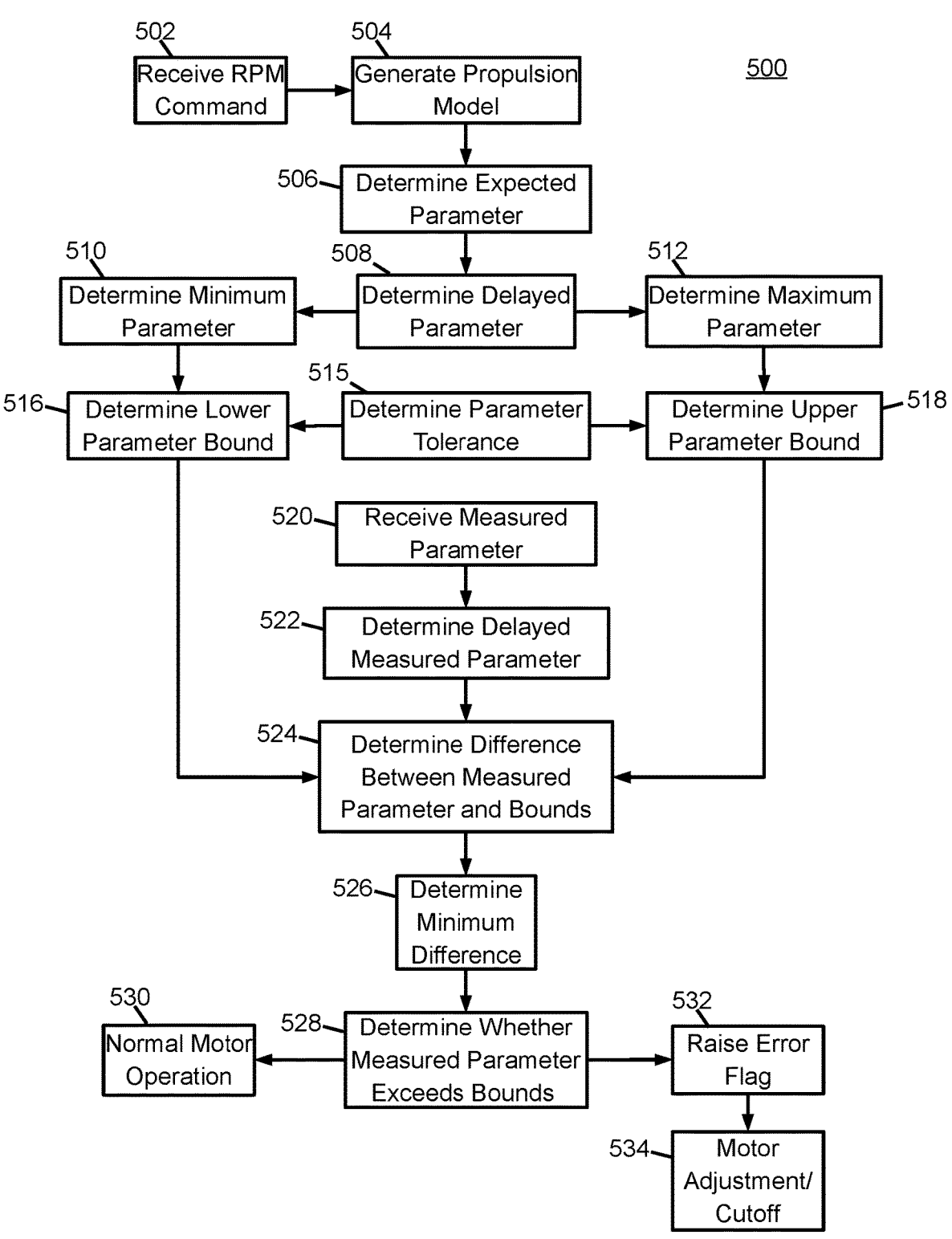
FIG. 5 is a flow diagram illustrating a method for monitoring the performance of an electric propulsion system according to some embodiments.

FIG. 5 is a flow diagram illustrating a method 500 for monitoring performance of an electric propulsion system according to some embodiments. The method 500 may include receiving, in block 502, an engine control command, such as an RPM command. The engine control command may be a command for the electric motor to operate according to a first operating parameter, such as to operate at a particular RPM, with a particular mount of thrust, using a particular amount of current, or the like.

In block 504, a propulsion model may be generated, used, determined, acquired, loaded or otherwise accessed. The propulsion model may be associated with operation of an electric motor, and may reflect a particular expected performance of the electric motor when operating at the commanded parameter. The propulsion model may be for a parameter over a particular time window, for example, a model of an electric motor's operation when changing to, or operating at, a commanded RPM over the time window. Generating the propulsion model may include generating expected parameters, or delayed expected parameters that are part of the model.

In block 506, an expected parameter, or expected parameter values, are determined. In some embodiments, the expected parameter values are determined according to the propulsion model, and the parameter may be at least one of torque of the electric motor or RPM of the electric motor. Additionally, in some embodiments, the expected parameters values are values of a parameter measurable during the operation of the electric motor. A first parameter model having expected parameter values and associated with operation of the electric motor, and determining the expected parameter or parameter values may include determining the first parameter model.

In block 508, one or more delayed parameters are determined. The delayed parameters may be a set of delayed parameters or set of delayed parameter values, and each set of delayed parameter values may be associated with the expected parameter values. In some embodiments, one or more delayed parameter models are determined, with each delayed parameter model having a set of delayed parameter values. Additionally, in some embodiments, each delayed parameter value set is associated with the expected parameter values at a different associated delay from a time associated with the expected parameter values, and in particular embodiments, each delayed parameter value set is associated with the expected parameter values at a delay of about 50 ms, 100 ms, 150 ms, or 200 ms from the time associated with the expected parameter values. Thus, a monitoring system may generate multiple parameter value sets or parameter models, with a first parameter set or first parameter model having a 0 ms delay, representing the expected parameter values, and additional or second parameter value sets or second parameter models that are delayed by different delay times.

In block 510, one or more minimum parameters are determined, and in block 512, one or more maximum parameters are determined. The minimum parameters are the minimum values of the models, including the first and second parameter models, at particular times. The maximum parameters are similarly determined, and are maximum values of the models, including the first and second parameter models, at particular times.

Thus, the minimum parameters are minimum values of all of the models at different times, with each minimum parameter being the minimum value of all the models at a particular time, and the maximum parameters are maximum values of all of the models at different times, with each maximum parameter being the maximum value of all the models at a particular time. Multiple minimum parameters are determined for a series of times to form, for example, a minimum boundary, and multiple maximum parameters are determined for a series of times to form a corresponding maximum boundary.

In block 515, one or more parameter tolerances are determined, and the parameter tolerances may be used to determine upper and lower boundaries from the minimum and maximum boundaries. In some embodiments, the parameter boundaries comprise an upper parameter boundary and a lower parameter boundary. In block 516, a lower parameter boundary is determined, and in block 518, and upper parameter boundary is determined. The lower parameter boundary may be determined according to minimum parameter values or according to minimum values of the expected parameter values and the plurality of delayed parameter value sets or delayed models at a selected time, and in some embodiments, further according to a first parameter tolerance. The upper parameter boundary may be determined according to maximum parameter values or maximum values of the expected parameter values and the plurality of delayed parameter value sets or delayed models at the selected time, and in some embodiments, further according to a second parameter tolerance. In some embodiments, the first tolerance value is about the same as the second tolerance value, and in other embodiments, the first tolerance value is different from the second tolerance value.

In block 520, a measured parameter value is received or otherwise acquired. The measured parameter value is for, or associated with, the operation of the electric motor. In block,

522, a delayed measured parameter is determined. The delayed measured parameter may be delayed by some time delay to ensure that a measured value of a parameter, such as the torque, is delayed somewhat to avoid too closely aligning with the expected parameter values, and prevent false error flags from minor measured parameter variances.

In block 524, the difference between the measured parameter, or the delayed measured parameter, and the parameter boundaries is determined, and in block 526, the minimum difference is determined. The minimum difference may, in some embodiments, be the smallest difference between the parameter boundaries, and either the measured parameter, or the delayed measured parameter. The minimum difference is the smaller of the differences between the measured parameter and the upper parameter boundary, and the difference between the measured parameter and the lower parameter boundary.

In block 528, a determination is made on whether the measured parameter, whether delayed or not, exceeds the parameter boundaries. The determination may include, in some embodiments, determining whether the minimum difference is greater than zero, indicating that the measured parameter is between the parameter boundaries, with a minimum difference less than zero indicating that the measure parameter is outside the parameter boundaries. Additionally, in some embodiments, the determination may further include filtering the measured parameters.

In block 532, normal motor operation may be continued or performed in response to the measured parameter not exceeding the parameter boundaries. In block 532, an error flag may be raised in response to the measured parameter value falling outside the parameter boundaries. In block 534, one or more commands may be generated for modifying operation of the electric motor in response to the error flag being raised. Modifying operation of the motor may include shutting down or turning off the motor, adjusting the commands for controlling the motor, logging an error, or the like.

An embodiment system includes an electric motor, at least one processor, and at least one non-transitory computer readable memory connected to the at least one processor and including computer program code. The at least one non-transitory computer readable memory and the computer program code are configured, with the at least one processor, to cause the system to perform at least determining a first parameter model having expected parameter values and associated with operation of the electric motor, where the expected parameters values are values of a parameter acquirable during operation of the electric motor, determining a plurality of second parameter models having a plurality of delayed parameter value sets, where each delayed parameter value set is associated with the expected parameter values at a different associated delay from a time associated with the expected parameter values, determining, according to the first parameter model and the plurality of second parameter models, parameter boundaries, acquiring a first parameter value for the operation of the electric motor, raising an error flag in response to the first parameter value falling outside the parameter boundaries, and modifying operation of the electric motor in response to the error flag being raised.

In some embodiments, the parameter acquirable during operation of the electric motor is at least one torque of the electric motor or revolutions per minute (RPM) of the electric motor. In some embodiments, the first parameter model is associated with a command for the electric motor to operate according to a first operating parameter. In some embodiments, the parameter boundaries include a minimum parameter boundary and a maximum parameter boundary, and the at least one non-transitory computer readable memory and the computer program code being configured, with the at least one processor, to cause the system to perform the determining the parameter boundaries includes the at least one non-transitory computer readable memory and the computer program code being configured, with the at least one processor, to cause the system to perform determining the minimum parameter boundary according to a minimum value of the expected parameter values and the plurality of delayed parameter value sets at a selected time, and determining the maximum parameter boundary according to a maximum value of the expected parameter values and the plurality of delayed parameter value sets at the selected time. In some embodiments, the at least one non-transitory computer readable memory and the computer program code being configured, with the at least one processor, to cause the system to perform the determining the minimum parameter boundary includes the at least one non-transitory computer readable memory and the computer program code being configured, with the at least one processor, to cause the system to perform: determining the minimum parameter boundary the according to the minimum value of the expected parameter values and the plurality of delayed parameter value sets at the selected time and further according to a first tolerance value, and where the at least one non-transitory computer readable memory and the computer program code being configured, with the at least one processor, to cause the system to perform the determining the maximum parameter boundary includes the at least one non-transitory computer readable memory and the computer program code being configured, with the at least one processor, to cause the system to perform: determining the maximum parameter boundary according to the maximum value of the expected parameter values and the plurality of delayed parameter value sets at the selected time, and further according to a second tolerance value. In some embodiments, the first tolerance value is about the same as the second tolerance value. In some embodiments, the at least one non-transitory computer readable memory and the computer program code are further configured, with the at least one processor, to cause the system to perform comparing the first parameter value with a time delay to the parameter boundaries, and determining that the first parameter value falls outside the parameter boundaries in response to the first parameter value with the time delay falling outside the parameter boundaries. In some embodiments, each second parameter model of the plurality of second parameter models is associated with the first parameter model at a delay of about 50 ms, 100 ms, 150 ms, or 200 ms from the time associated with the first parameter model.

An embodiment system includes at least one processor, and at least one non-transitory computer readable memory connected to the at least one processor and including computer program code. The at least one non-transitory computer readable memory and the computer program code are configured, with the at least one processor, to cause the system to perform at least determining one or more first parameter models each having expected parameter values and being associated with operation of an electric motor, where the expected parameters values of each first parameter model of the one or more first parameter models are values of a different parameter acquirable during operation of the electric motor, determining, for each first parameter model of the one or more first parameter models, a plurality of second parameter models, where each second parameter model of the plurality of second parameter models has a plurality of delayed parameter value sets, where each delayed parameter value set is associated with the expected parameter values of the respective first parameter model, at a different associated delay from a time associated with the expected parameter values of the respective first parameter model, determining parameter boundaries for each first parameter model of the one or more parameter models according to the respective first parameter model and the plurality of second parameter models associated with the respective first parameter model, acquiring one or more first parameter values for the operation of the electric motor, where the one or more first parameter values are each associated with the expected parameters values of a first parameter model of the one or more first parameter models, raising an error flag in response to at least one of the one or more first parameter values falling outside respective parameter boundaries, and modifying operation of the electric motor in response to the error flag being raised.

In some embodiments, the one or more first parameter models includes two first parameters models, where an associated parameter of a first one of the two first parameter models is torque of the electric motor, and where an associated parameter of a second one of the two first parameter models is revolutions per minute (RPM) of the electric motor. In some embodiments, the parameter boundaries for each first parameter model of the one or more first parameter models includes a minimum parameter boundary and a maximum parameter boundary for the respective first parameter model, and where the at least one non-transitory computer readable memory and the computer program code being configured, with the at least one processor, to cause the system to perform the determining the parameter boundaries for each first parameter model includes the at least one non-transitory computer readable memory and the computer program code being configured, with the at least one processor, to cause the system to perform determining the minimum parameter boundary for the respective first parameter model according to a minimum value of the first parameter model and plurality of second parameter models of the respective first parameter model at a selected time and further according to a first tolerance value, and determining the maximum parameter boundary for the respective first parameter model according to a maximum value of the first parameter model and plurality of second parameter models of the respective first parameter model at the selected time and further according to a second tolerance value. In some embodiments, the at least one non-transitory computer readable memory and the computer program code are further configured, with the at least one processor, to cause the system to perform comparing each first parameter value of the one or more first parameter values to the parameter boundaries of a first parameter model associated with the first parameter values, and determining that the respective first parameter value falls outside the parameter boundaries in response to the first parameter value falling outside the parameter boundaries.

An embodiment method, includes generating a propulsion model associated with operation of an electric motor, determining expected parameter values according to the propulsion model, where the expected parameters values are values of a parameter acquirable during the operation of the electric motor, determining a plurality of delayed parameter value sets, where each delayed parameter value set is associated with the expected parameter values at a different associated delay from a time associated with the expected parameter values, determining, according to the expected parameter values and the plurality of delayed parameter value sets, parameter boundaries, acquiring a first parameter value for the operation of the electric motor, raising an error flag in response to the first parameter value falling outside the parameter boundaries, and generating commands for modifying operation of the electric motor in response to the error flag being raised.

In some embodiments, the parameter is at least one torque of the electric motor or revolutions per minute (RPM) of the electric motor. In some embodiments, the propulsion model is associated with a command for the electric motor to operate according to a first operating parameter. In some embodiments, the parameter boundaries include a minimum parameter boundary and a maximum parameter boundary, and where the determining the parameter boundaries includes determining the minimum parameter boundary according to a minimum value of the expected parameter values and the plurality of delayed parameter value sets at a selected time, and determining the maximum parameter boundary according to a maximum value of the expected parameter values and the plurality of delayed parameter value sets at the selected time. In some embodiments, the determining the minimum parameter boundary includes determining the minimum parameter boundary the according to the minimum value of the expected parameter values and the plurality of delayed parameter value sets at the selected time and further according to a first tolerance value, and where the determining the maximum parameter boundary includes determining the maximum parameter boundary according to the maximum value of the expected parameter values and the plurality of delayed parameter value sets at the selected time, and further according to a second tolerance value. In some embodiments, the first tolerance value is about the same as the second tolerance value. In some embodiments, the method further includes comparing the first parameter value with a time delay to the parameter boundaries, and determining that the first parameter value falls outside the parameter boundaries in response to the first parameter value with the time delay falling outside the parameter boundaries. In some embodiments, each delayed parameter value set of the delayed parameter value sets is associated with the expected parameter values at a delay of about 50 ms, 100 ms, 150 ms, or 200 ms from the time associated with the expected parameter values.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A system, comprising:
an electric motor;
at least one processor; and
at least one non-transitory computer readable memory connected to the at least one processor and including computer program code, wherein the at least one non-transitory computer readable memory and the computer program code are configured, with the at least one processor, to cause the system to perform at least:
determining a first parameter model having expected parameter values and associated with operation of the electric motor, wherein the expected parameter values are values of a parameter acquirable during the operation of the electric motor;
determining a plurality of second parameter models having a plurality of delayed parameter value sets, wherein each delayed parameter value set has parameter values that are the same as the expected parameter values at a different associated delay from a time associated with the expected parameter values;
determining, according to the first parameter model and the plurality of second parameter models, parameter boundaries, wherein the parameter boundaries are set, for each time of a plurality of times in the first parameter model, according to a maximum value of all values, at the respective time, of the first parameter model and each second parameter model of the plurality of second parameter models, and further according to a minimum value of all values, at the respective time, of the first parameter model and each second parameter model of the plurality of second parameter models;
acquiring a first parameter value for the operation of the electric motor;
raising an error flag in response to the first parameter value falling outside the parameter boundaries; and
modifying the operation of the electric motor in response to the error flag being raised.

2. The system of claim 1, wherein the parameter acquirable during the operation of the electric motor is at least one torque of the electric motor or revolutions per minute (RPM) of the electric motor.

3. The system of claim 2, wherein the first parameter model is associated with a command for the electric motor to operate according to a first operating parameter.

4. The system of claim 1, wherein the parameter boundaries comprise a minimum parameter boundary and a maximum parameter boundary; and
wherein the at least one non-transitory computer readable memory and the computer program code being configured, with the at least one processor, to cause the system to perform the determining the parameter boundaries comprises the at least one non-transitory computer readable memory and the computer program code being configured, with the at least one processor, to cause the system to perform:
determining the minimum parameter boundary according to a minimum value of the expected parameter values and the plurality of delayed parameter value sets at a selected time; and
determining the maximum parameter boundary according to a maximum value of the expected parameter values and the plurality of delayed parameter value sets at the selected time.

5. The system of claim 4, wherein the at least one non-transitory computer readable memory and the computer program code being configured, with the at least one processor, to cause the system to perform the determining the minimum parameter boundary comprises the at least one non-transitory computer readable memory and the computer program code being configured, with the at least one processor, to cause the system to perform:
determining the minimum parameter boundary according to the minimum value of the expected parameter values and the plurality of delayed parameter value sets at the selected time and further according to a first tolerance value; and
wherein the at least one non-transitory computer readable memory and the computer program code being configured, with the at least one processor, to cause the system to perform the determining the maximum parameter boundary comprises the at least one non-transitory computer readable memory and the computer program code being configured, with the at least one processor, to cause the system to perform:

determining the maximum parameter boundary according to the maximum value of the expected parameter values and the plurality of delayed parameter value sets at the selected time, and further according to a second tolerance value.

6. The system of claim 5, wherein the first tolerance value is about the same as the second tolerance value.

7. The system of claim 1, wherein the at least one non-transitory computer readable memory and the computer program code are further configured, with the at least one processor, to cause the system to perform:

comparing the first parameter value with a time delay to the parameter boundaries; and determining that the first parameter value falls outside the parameter boundaries in response to the first parameter value with the time delay falling outside the parameter boundaries.

8. The system according to claim 1, wherein each second parameter model of the plurality of second parameter models is associated with the first parameter model at a delay of about 50 ms, 100 ms, 150 ms, or 200 ms from the time associated with the first parameter model.

9. A system, comprising:

at least one processor; and at least one non-transitory computer readable memory connected to the at least one processor and including computer program code, wherein the at least one non-transitory computer readable memory and the computer program code are configured, with the at least one processor, to cause the system to perform at least:

determining one or more first parameter models each having expected parameter values and being associated with operation of an electric motor, wherein the expected parameter values of each first parameter model of the one or more first parameter models are values of a different parameter acquirable during the operation of the electric motor;

determining, for each first parameter model of the one or more first parameter models, a plurality of second parameter models, wherein each second parameter model of the plurality of second parameter models has a plurality of delayed parameter value sets, wherein each delayed parameter value set has parameter values that are the same as the expected parameter values of the respective first parameter model, at a different associated delay from a time associated with the expected parameter values of the respective first parameter model;

determining parameter boundaries for each first parameter model of the one or more parameter models according to the respective first parameter model and the plurality of second parameter models associated with the respective first parameter model, wherein the parameter boundaries are set, for each time of a plurality of times in the first parameter model, according to a maximum value of all values, at the respective time, of the first parameter model and each second parameter model of the plurality of second parameter models, and further according to a minimum value of all values, at the respective time, of the first parameter model and each second parameter model of the plurality of second parameter models;

acquiring one or more first parameter values for the operation of the electric motor, wherein the one or more first parameter values are each associated with the expected parameter values of a first parameter model of the one or more first parameter models;

raising an error flag in response to at least one of the one or more first parameter values falling outside respective parameter boundaries; and modifying the operation of the electric motor in response to the error flag being raised.

10. The system of claim 9, wherein the one or more first parameter models comprises two first parameter models, wherein an associated parameter of a first one of the two first parameter models is torque of the electric motor, and wherein an associated parameter of a second one of the two first parameter models is revolutions per minute (RPM) of the electric motor.

11. The system of claim 9, wherein the parameter boundaries for each first parameter model of the one or more first parameter models comprises a minimum parameter boundary and a maximum parameter boundary for the respective first parameter model; and wherein the at least one non-transitory computer readable memory and the computer program code being configured, with the at least one processor, to cause the system to perform the determining the parameter boundaries for each first parameter model comprises the at least one non-transitory computer readable memory and the computer program code being configured, with the at least one processor, to cause the system to perform:

determining the minimum parameter boundary for the respective first parameter model according to a minimum value of the first parameter model and plurality of second parameter models of the respective first parameter model at a selected time and further according to a first tolerance value; and determining the maximum parameter boundary for the respective first parameter model according to a maximum value of the first parameter model and plurality of second parameter models of the respective first parameter model at the selected time and further according to a second tolerance value.

12. The system of claim 9, wherein the at least one non-transitory computer readable memory and the computer program code are further configured, with the at least one processor, to cause the system to perform:

comparing each first parameter value of the one or more first parameter values to the parameter boundaries of a first parameter model associated with the first parameter values; and determining that the respective first parameter value falls outside the parameter boundaries in response to the first parameter value falling outside the parameter boundaries.

13. A method, comprising:

generating a propulsion model associated with operation of an electric motor;

determining expected parameter values according to the propulsion model, wherein the expected parameter values are values of a parameter acquirable during the operation of the electric motor;

determining a plurality of delayed parameter value sets, wherein each delayed parameter value set has parameter values that are the same as the expected parameter values at a different associated delay from a time associated with the expected parameter values;

determining, according to the expected parameter values and the plurality of delayed parameter value sets, parameter boundaries, wherein the parameter boundaries are set, for each time of a plurality of times in the expected parameter values, according to a maximum value of all values, at the respective time, of the expected parameter value and each delayed parameter value set of the delayed parameter values sets, and further according to a minimum value of all values, at the respective time, of the expected parameter value and each delayed parameter value set of the delayed parameter values sets;

acquiring a first parameter value for the operation of the electric motor;

raising an error flag in response to the first parameter value falling outside the parameter boundaries; and generating commands for modifying the operation of the electric motor in response to the error flag being raised.

14. The method of claim 13, wherein the parameter is at least one torque of the electric motor or revolutions per minute (RPM) of the electric motor.

15. The method of claim 14, wherein the propulsion model is associated with a command for the electric motor to operate according to a first operating parameter.

16. The method of claim 13, wherein the parameter boundaries comprise a minimum parameter boundary and a maximum parameter boundary; and wherein the determining the parameter boundaries comprises:

determining the minimum parameter boundary according to a minimum value of the expected parameter values and the plurality of delayed parameter value sets at a selected time; and determining the maximum parameter boundary according to a maximum value of the expected parameter values and the plurality of delayed parameter value sets at the selected time.

17. The method of claim 16, wherein the determining the minimum parameter boundary comprises determining the minimum parameter boundary according to the minimum value of the expected parameter values and the plurality of delayed parameter value sets at the selected time and further according to a first tolerance value; and wherein the determining the maximum parameter boundary comprises determining the maximum parameter boundary according to the maximum value of the expected parameter values and the plurality of delayed parameter value sets at the selected time, and further according to a second tolerance value.

18. The method of claim 17, wherein the first tolerance value is about the same as the second tolerance value.

19. The method of claim 13, further comprising:

comparing the first parameter value with a time delay to the parameter boundaries; and determining that the first parameter value falls outside the parameter boundaries in response to the first parameter value with the time delay falling outside the parameter boundaries.

20. The method according to claim 13, wherein each delayed parameter value set of the delayed parameter value sets is associated with the expected parameter values at a delay of about 50 ms, 100 ms, 150 ms, or 200 ms from the time associated with the expected parameter values.

* * * * *